United States Patent [19]
Sasaki et al.

[11] Patent Number: 5,715,488
[45] Date of Patent: Feb. 3, 1998

[54] PHOTOGRAPHIC SYSTEM COMPRISING A PHOTOGRAPHIC CAMERA EQUIPPED WITH A MAGNETIC RECORDING HEAD

[75] Inventors: Wataru Sasaki; Yutaka Yoshida, both of Saitama, Japan

[73] Assignees: Fuji Photo Film Co., Ltd., Kanagawa; Fuji Photo Optical Co., Ltd., Saitama, both of Japan

[21] Appl. No.: 626,372

[22] Filed: Apr. 2, 1996

[30] Foreign Application Priority Data

Apr. 3, 1995 [JP] Japan ................... 7-077849

[51] Int. Cl.$^6$ .................................. G03B 17/24
[52] U.S. Cl. .................................. 396/319
[58] Field of Search .................... 396/319, 320, 396/310

[56] References Cited

U.S. PATENT DOCUMENTS

| 5,136,317 | 8/1992 | Goto et al. | 396/319 |
| 5,343,264 | 8/1994 | Itoh et al. | 396/319 |

FOREIGN PATENT DOCUMENTS 6-19057  1/1994  Japan.

Primary Examiner—David M. Gray
Attorney, Agent, or Firm—Young & Thompson

[57] ABSTRACT

A camera, which is equipped with a magnetic head for recording data in a magnetic track of a film strip of a type having a perforation formed in the magnetic track and positioned at a specified distance from the last image frame toward a film trailer, has a controller for continuously advancing the film strip until the film makes the perforation pass over the magnetic head so as thereby to rub a contact surface of the magnetic head with edges of the perforation for cleaning.

6 Claims, 10 Drawing Sheets

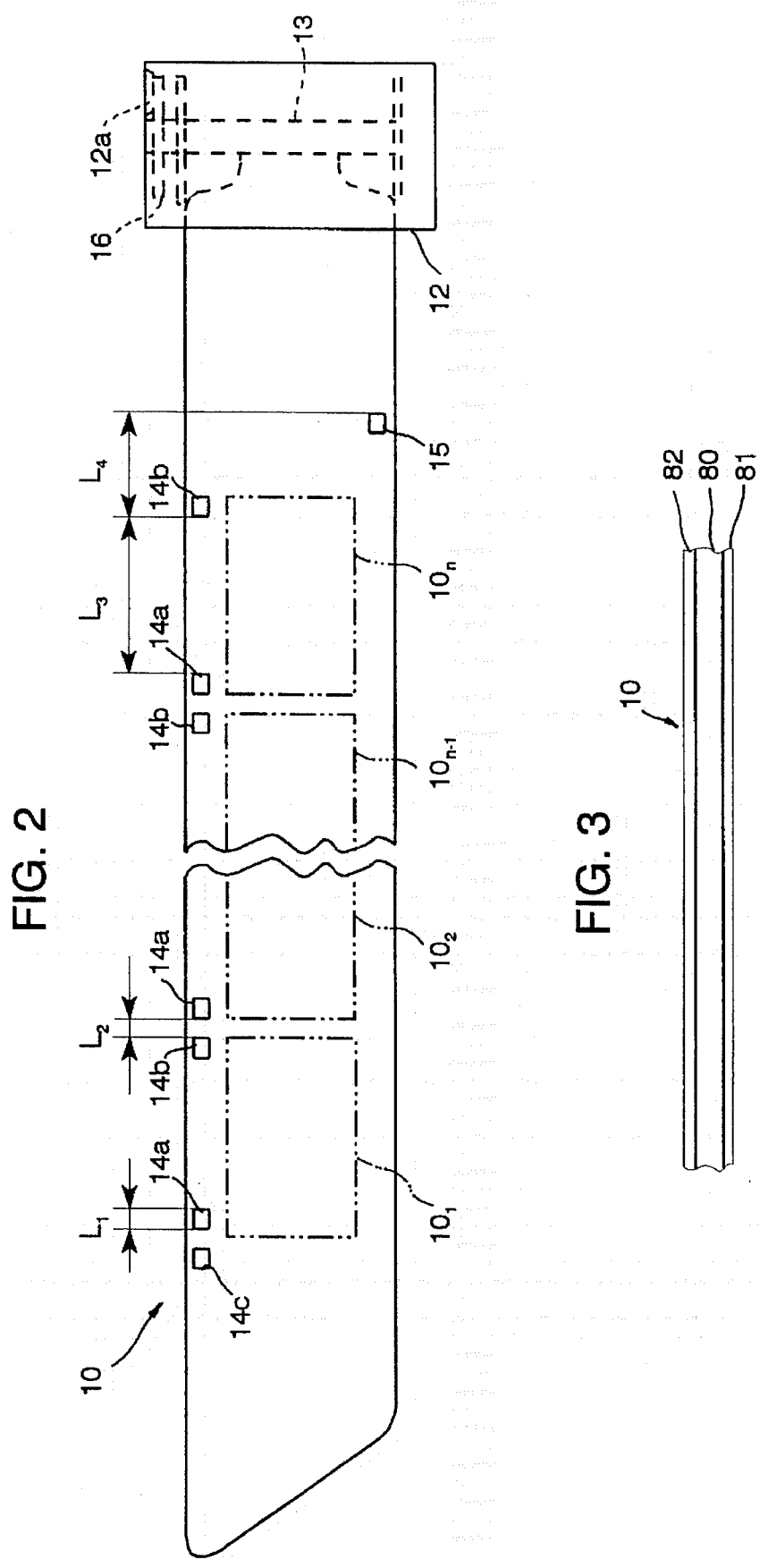

TO PULSE COUNTER

TO PULSE COUNTER

PHOTOGRAPHIC SYSTEM COMPRISING A PHOTOGRAPHIC CAMERA EQUIPPED WITH A MAGNETIC RECORDING HEAD

BACKGROUND OF THE INVENTION

1. Field of the Invention

This invention relates to a photographic camera, and, more particularly, to a photographic system comprising photographic still camera equipped with a magnetic head for magnetically recording data in a magnetic data recording track of a film strip.

2. Description of Related Art

In what is called an advanced photographic system (APS) including a new type of films which has been recently announced, cameras pertinently prepared to the new system are equipped with magnetic heads for entering and recording required data including exposure data, such as shutter speeds, exposure apertures and the use of artificial light, and selected data regarding exposed frames according to the photographer's intention in a magnetic data recording track. These required and selected data are read and used as input data by a printer for proper exposure control. The film strip available for the new system has a transparent magnetic layer coated on one side of a base substrate opposed to the side of emulsion layer. Such a camera pertinently prepared to the new system is provided with a magnetic head installed to, for instance, a pressure plate behind an exposure aperture frame so as to contact with the transparent magnetic layer of the film strip. The magnetic head is driven for data recording in the recording track of the film strip whenever the film strip is advanced after exposure of each image frame.

In order for the magnetic head to perform proper magnetic recording, proper contact of the magnetic head with the magnetic layer must be always provided. As is well known in the art, the magnetic head, in particular the magnetic head surface, rubs the magnetic layer and produces film shavings which cling on the magnetic head surface we well as ambient dust. These shavings and dust having clung to the magnetic head surface develop a slight gap and/or yield non uniformity of contact between the magnetic head surface and the magnetic layer. Such a lack of the uniformity of contact and a gap cause deterioration of frequency characteristics and aggravation of the intensity of magnetization of the magnetic layer which are always undesirable for proper magnetic recording.

Foreign materials or dust clung to the magnetic head surface during film advancement shave the magnetic layer with a result of destroying or loosing recorded data and/or with the effect of lowering the intensity of magnetization of the recorded data. Film strips having experienced these aggravation of magnetic characteristics. Data read from such a film strip and used as input data by a printer encounters degradation in signal level, resulting in poor or improper data reproduction and inadequate exposure and printing control. In order for the magnetic head to eliminate to become unclean, the magnetic head surface may be periodically cleaned directly with a piece of texture infiltrated with alcohol.

While the utilization of alcohol infiltrated texture is effective in removing dust and shavings having clung to the magnetic head surface, nevertheless, various constraints must be imposed on cleaning work. In addition, the cleaning work is somewhat technically troublesome and is unpractical for ordinary photographers. For instance, a drop-in loading type of camera which has only a narrow opening for access to the camera interior requires the photographer to remove its back rid in order to obtain access to the magnetic head and clean it. It is, however, almost impossible for ordinary photographers to remove the back rid from the camera.

SUMMARY OF THE INVENTION

It is an object of the invention to provide a photographic system comprising the combination of a still camera equipped with a magnetic head and a film strip coated with a magnetic recording layer thereon.

It is another object of the invention to provide a photographic system comprising a still camera equipped with a magnetic head through which data is entered into a magnetic layer coated on a film strip and which is cleaned by said film strip.

The foregoing objects of the invention are achieved by providing a photographic system comprising the combination of a still camera equipped with a magnetic head and a film strip of a type having a magnetic layer coated on one side of a film substratum opposed to the side thereof on which a photographic emulsion layer is coated, frame perforations, one for each of a row of image frames, formed along the row of the image frames in one lengthwise margin of the film strip, and an independent perforation located at a specified distance from the last image frame and formed in another lengthwise margin of the film strip. The magnetic head is located in a path of the perforation of the film strip loaded in the camera and held in contact with the magnetic layer of the film strip during film advancement so as to record data in a recording track in which the perforation exists. The camera is provided with a film advanced length observing means for observing advancement of a film strip loaded in the camera to detect an advanced length of the film strip from when the last image frame has passed over the magnetic head, and a control means for continuously causing a film advancing means, such as including a reversible motor operative in film winding and film rewinding directions, to advance the film strip until the film advancement observing means detects a length of film advancement equal to the specified distance to the perforation so that the film strip has the perforation pass over the magnetic head, thereby rubbing a contact surface of the magnetic head with edges of the perforation for cleaning.

The film advanced length observing means basically includes a pulse generator for generating periodical pulses, a pulse counter for counting pulses generated by the pulse generator, and means for calculating an advanced length of the film strip based on the number of pulses counted by the pulse counter. The pulse generator may take any of various types, such as generating pulses one for every specified angular rotation of the reversible motor, generating pulses one per unit length of advancement of the film strip, and generating pulses on a specified frequency.

According to another aspect of the invention, the film advanced length observing means may comprise a pulse generating means for generating pulses in synchronism with rotations of the reversible motor, a perforation sensor for detecting both edges of each frame perforation, and a pulse number determining means for detecting a speed of advancement of the film strip based on a number of pulses which the pulse generating means generates for a period between detection of a leading side edge and a trailing side edge of each frame perforation by the perforation sensor and a distance between the leading side edge and the trailing side edge of each frame perforation, which is standardized, and for determining a critical number of pulses to be generated by the pulse generator necessary for the reversible motor to advance the film strip by the specified distance based on the speed of advancement of the film strip. The pulse number determining means may detect a speed of advancement of a film strip based on a number of pulses for a period between detection of each adjacent two frame perforations and a distance between the adjacent two frame perforations, which is standardized.

According to the invention, in spite of film winding/rewinding systems incorporated in the camera according to the invention, such as a system in which a film strip is wound up exposure by exposure and rewound after exposure of the whole image frames and a system in which the entire length of a film strip is pre-wound and, thereafter, rewound exposure by exposure, the length of film advancement after passage of the last image frame over the magnetic head is observed measured on the basis of periodic pulses such that the film strip has the independent perforation at a specified distance from the last image frame pass over the magnetic head. This makes the edges of the independent perforation rub the magnetic head surface with the effect of removing off dust and shavings having clung to the magnetic head surface, so as thereby to clean the magnetic head whenever the camera concludes the use of a roll of film strip and maintain the magnetic head in good condition for data recording.

BRIEF DESCRIPTION OF THE DRAWINGS

The above and other objects and features of the present invention will be clearly understood from the following description with respect to a preferred embodiment thereof when considered in conjunction with the accompanying drawings, wherein the same reference numerals have been used to denote same or similar parts or elements throughout the drawings and in which:

FIG. 2 is an explanatory view of a film strip 10 and a film cartridge, partly cut away, for use with the camera of FIG. 1;

FIG. 3 is a schematic cross-sectional view of the film strip of FIG. 2;

DETAILED DESCRIPTION OF THE EMBODIMENTS

Figure 1:
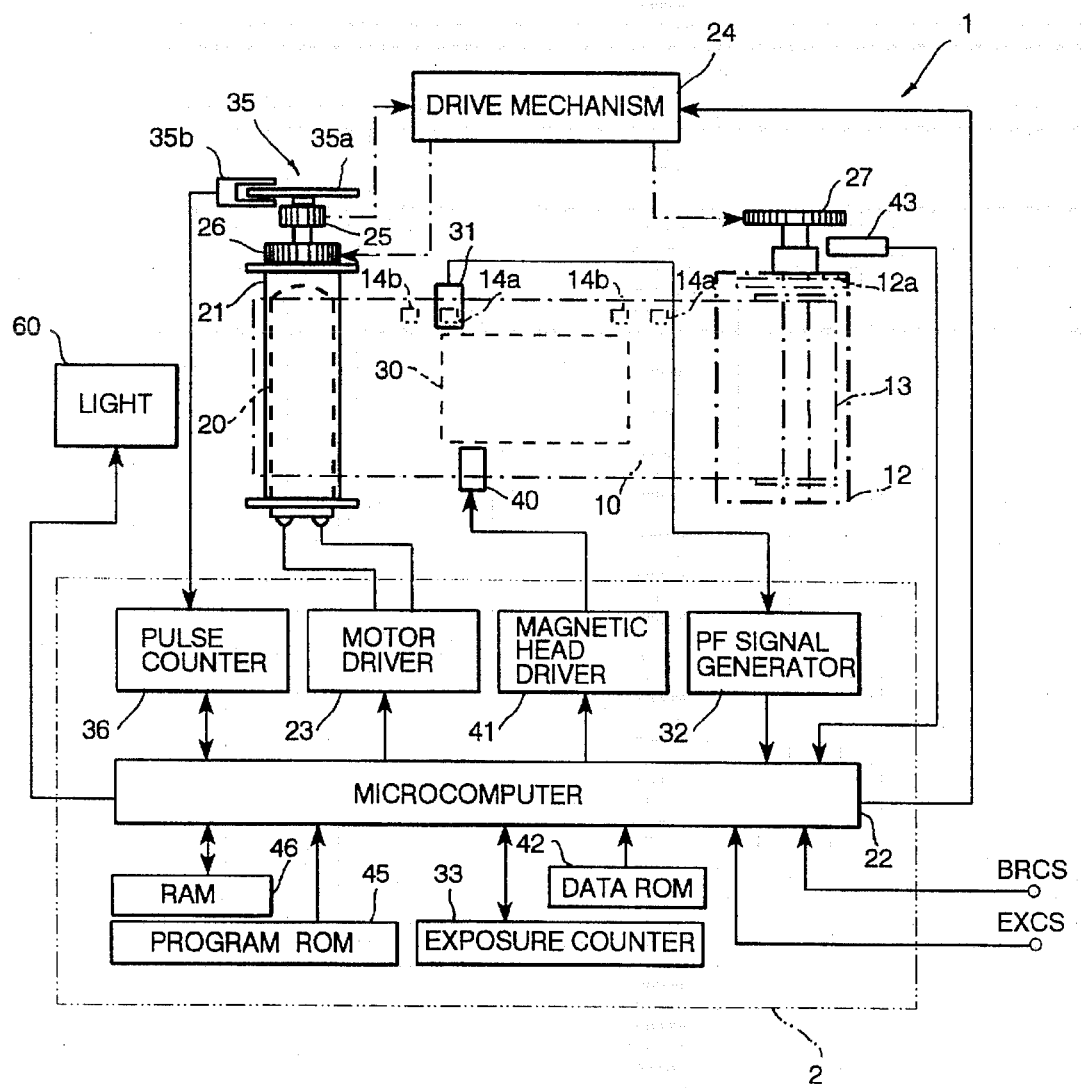
FIG. 1 is an illustration schematically showing a camera in accordance with an embodiment of the present invention.

Because a camera body construction, an exposure system, including a taking lens system, an aperture mechanism and a shutter mechanism, a view finder system, etc. which are necessary to the camera are well known in construction and operation to those skilled in the art, the following description will be directed in particular to elements forming part of, or cooperating directly with, a camera in accordance with the invention.

Referring to the drawings in detail, in particular to FIGS. 2 and 3, a new format of film strip 10 (which will be hereafter referred as simply to a film strip) partly cut away is shown. As shown in FIG. 3, the film strip 10 has the architecture of layers in which a multi emulsion layer 82, which is of a type well known to a person in the art, is on the front of a substratum strip 80, and a transparent magnetic strip layer 81 on the back of the substratum strip 80.

Film strip 10 has a trailer secured to a spool shaft 13a of a cartridge spool 13 rotatably held inside a film cartridge 12. The film strip 10 is formed with an alternate arrangement of front extremity perforations 14a and rear extremity perforations 14b in one margin thereof along almost the entire length thereof. The front extremity perforations 14a, which are arranged at specified regular intervals ($L_2+L_3$), unconditionally delimit front borders of image frames $10_1$, $10_2$, . . . . . , $10n$, respectively, and the rear extremity perforations 14b, which are arranged at the regular intervals ($L_2+L_3$), unconditionally delimit rear borders of the image frames $10_1$, $10_2$, . . . . . , $10n$, respectively. Each adjacent front and rear extremity perforations 14a and 14b are separated at a specified interval ($L_2$). The film strip 10 is further formed with a positioning perforation 14c in a leader at a specified distance $L_2$ forward from the first front extremity perforation 14a. The utilization is made of this positioning perforation 14c in order to place the first image frame $10_1$ in a proper exposure position or at an exposure aperture in the camera. Each of the perforations 14a, 14b and 14c has a length in a film winding/rewinding direction. The film strip 10 is further formed with a turn-around perforation, which is independent from the frame perforations and in another margin thereof in the trailer. This turn-around perforation 15 is at a specified distance $L_4$ from the last rear extremity perforation 14b toward the trailer of the film strip 10. The utilization is made of the turn-around perforation 15 in order for the film strip 10 to be optically or mechanically detected at the trailer.

Film cartridge 12 is provided with a film spool 13 having a bar code disk 16 integrally formed therewith, or otherwise secured thereto. This bar code disk 16 bears a bar code symbol representative of film information including the type of film, the speed of film speed and the number exposures. The top wall of the film cartridge 12 is formed with a see-through windows or opening 12a through which the bar code symbol on the bar code disk 16 is photoelectrically picked up.

Figure 4:
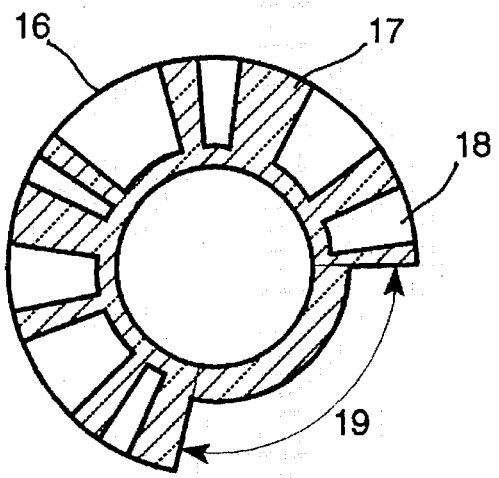
FIG. 4 is a plan view of a bar code disk shown by way of example.

As shown by way of example in FIG. 4, the bar code disk 16 is partly cut out. The bar code symbol comprises two different breadths of, i.e. wide and narrow, radial black bars 17 arranged at alternate wide and narrow angular intervals, in other words, has an alternate arrangement of black bars 17 and space bars (which are spaces left between adjacent black radial bars) 18. The black bars 17 have a reflection factor lower than the space bars 18. The wide black bar and wide space bar effect an indication of logical value "1", and the narrow black bar and narrow space bar effect an indication of logical value "0". Combinations of these black bars and space bars represent various values as information attributive to a film strip 10 in the film cartridge 12. The sector-shaped cut-out 19 forms what is called a black-quiet zone in the new photographic system (APS) and provides a light reflection less than the black bars 17. This quiet zone 19 defines extremities of a bar code symbol and, when taken out of a camera, provides a visual indication that the film is not yet exposed and that it has been exposed according to its positions. Though not shown in the figure, the film cartridge 12 at one end has an opening other than the opening 12a for showing the bar code zone of the bar code disk 16 to effect an indication that the film 10 has been exposed or developed and for showing the quiet zone 19 of the bar code disk 16 to effect an indication that the film 10 is fresh or unexposed. In order to show the quiet zone 19 in the opening, a camera prepared pertinently to requirements for the new advanced photographic system (APS) has a mechanism to turn the bar code disk 16 when unwinding the film strip 10 after full or partly exposure of the film strip 10. On the other hand, the bar code zone of the bar code disk 16 is, for instance, mechanically contacted by a detector, such as a micro switch when the film cartridge 12 is loaded, of the camera so as to observe the film exposure status, i.e. whether the film strip 10 in the film cartridge 12 is fresh or at least partly exposed.

Referring to FIG. 1 schematically showing a photographic still camera (which will be hereafter referred to simply as a camera) 1 in accordance with an embodiment of this invention, which is designed and prepared pertinently to the requirements for the new advanced photographic system (APS), the camera 1 has a film advancing, or winding/ rewinding, mechanism including a motor 20, a drive mechanism 24, gears 25–27 forming part of the drive mechanism 24. The motor 20 is shaped so as to be built in the interior of a hollow wind-up spool 21 and controlled to rotate in opposite directions, namely film winding and film rewinding directions to wind a film strip 10 off the film cartridge and to rewind the film strip 10 into the film cartridge 12, by means of a camera control unit 2 including comprising a microcomputer 22 through a motor driver 23. The drive mechanism 24 is controlled by means of the camera controller 2 to switch its operation between a film winding mode in which rotation of the motor 20 is connected only to the film wind-up spool 21 and disconnected from the cartridge spool 13 and a film rewinding mode in which rotation of the motor 20 is connected only to the cartridge spool 13 and disconnected from the film wind-up spool 21. Specifically, after every exposure, the camera control unit 2 causes the motor 20 to rotate in the film winding direction so as to rotate the film wind-up spool 21 through the drive mechanism 24 via the gears 25 and 26, thereby winding up the film strip 10 by one frame. When exposure is made for the last image frame 10n, the camera control unit 2 causes the motor 20 to rotate in the reversed direction, i.e. in the film rewinding direction, so as to rotate the cartridge spool 13 of film cartridge 12 through the drive mechanism 24 via the gears 25 and 27, thereby continuously rewinding the full length of film strip 10 into the film cartridge 12. Further, immediately after loading the film cartridge 12 in the camera 1, the camera control unit 2 switches the drive mechanism 24 into the film rewinding mode and causes the motor 20 to rotate in the film rewinding direction so as to turn the cartridge spool 13 for positioning the bar code zone at the cartridge opening 12a for bar code reading and subsequently switches the drive mechanism 24 into the film winding mode and causes the motor 20 to rotate in the film winding direction so as to turn the cartridge spool 13 for forcing the leader of film strip 10 out of the film cartridge 12 until the first image frame $10_1$ is placed in a proper exposure position. At an upper position from an exposure aperture frame 30, the camera 1 is provided with a photoelectric sensor 31 as a perforation sensor for detecting the perforations 14a–14c. Specifically, the photoelectric sensor 31 comprises, for instance, a reflection type photo-coupler including an infrared light emitting diode (LED) and a photo-transistor cell which generates a photoelectric output at a level in conformity with the amount or intensity of infrared light received. Various types of photoelectric sensors are well known in the art and the photoelectric sensor 31 may take any one of well known types. The output of the photoelectric sensor 31 is transmitted to a signal generator circuit 32 which generates a binary signal indicating detection of a perforation which in turn is sent to the microcomputer 22. The signal generator circuit 32 generates a binarized signal for instance, a high level signal as a perforation detection signal when any one of the perforations 14a–14c is at the photoelectric sensor 31 and a low level signal when the perforations 14a–14c is off the photoelectric sensor 31.

Camera control unit 2 controls a frame or exposure counter 33 such that the exposure counter 33 changes its indication of an exposure number C by an increment of 1 (one) every time the signal generator circuit 32 generates a high level signal in response to the detection of a front extremity perforation 14a by the photoelectric sensor 31. In addition, the camera control unit 2 resets the exposure counter 33 to change its indication number C to 0 (zero) with a signal which is generated when a back rid is closed subsequently to loading a film cartridge 12. The exposure counter 33 transmits an information signal representative of the indication number C as an exposed frame number to the camera control unit 2.

Figure 5:
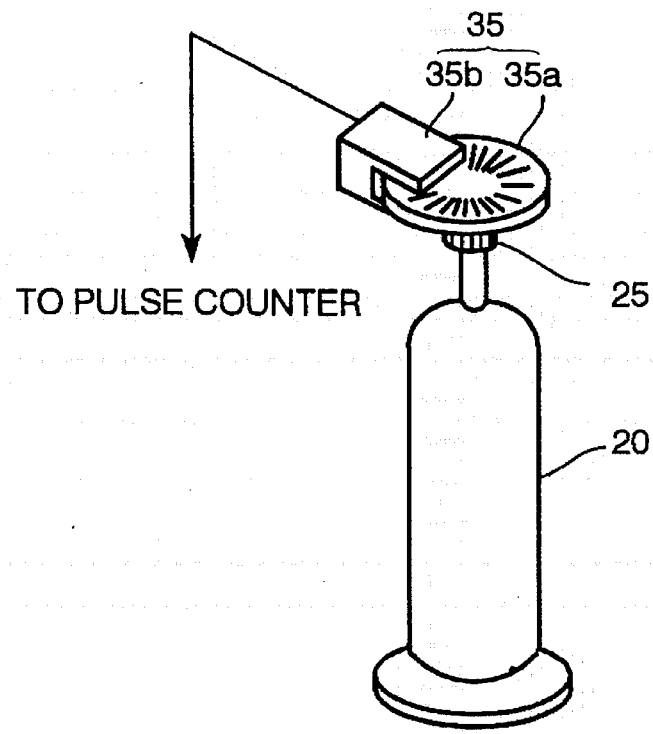
FIG. 5 is a perspective view of a rotary encoder shown by way of example.

Motor 20 is equipped with a rotary encoder 35 as shown in detail in FIG. 5. This rotary encoder 35 includes an encoder disk 35a formed with a number of radial slits arranged at regular angular intervals and a photo-interrupter 35b of a type comprising a light emitter and a light receptor. Various types of rotary encoders are well known in the art and the rotary encoder 35 may take any one of well known types. The encoder disk 35a is secured to a rotary shaft 20a of the motor 20 and put between the light emitter and light receptor of the photo-interrupter 35b. The photo-interrupter 35b generate a pulse signal every time it detects a slit of the encoder disk 35a. The number of encode pulses N, which represent an angular speed of the motor 20, and hence a length of film advancement per unit time, is counted by a pulse counter 36. While the microcomputer 22 receives information of the number of encode pulses N and, based on the number of encode pulses N, it monitors the length of film advancement and, when the number of encode pulses N reaches a pre-fixed number α, stops the motor 20.

Camera 1 at a lower position from the exposure aperture frame 30 is further provided with a magnetic head 40 for entering magnetic data in the film strip 10. This magnetic head 40 is secured, for instance, to a back pressure plate (not shown) so as to be in light contact with a lower track of the magnetic layer 81 of the film unit 80 where the turn-around perforation 15 is formed. The magnetic head 40 is driven by means of a magnetic head driver 41 to enter binary code data of exposure information including a shutter speed and an exposure aperture used into the magnetic layer 81. The magnetic head 40 at its front end as viewed in the film winding direction is positioned at a distance $L_{PH}$ far from the center of the photoelectric sensor 31 on the side remote from the wind-up spool 21. The microcomputer 22 cooperates with a read only memory (ROM) 46 as a data ROM in which various exposure data are stored in the form of binary codes. At a completion of exposure for each image frame, the microcomputer 22 retrieves a binary code in conformity with exposure data actually used and transmits it to the magnetic head driver 41 so as to drive the magnetic head 40 according to the binary code. In this instance, the magnetic head driver 41 drives at a timing according to a speed of film advancement which is computed on the basis of the number of encode pulses N in the microcomputer 22 with an effect of recording the same length of bits of the binary code in the magnetic layer 81. Various types of magnetic heads are well known in the art and the magnetic head 40 may take any one of well known types.

Camera 1 is further equipped with a reflection type of photoelectric sensor 43 as a bar code sensor right above the opening 12a of a film cartridge 12 loaded in the camera 1 for picking up bar codes of the bar code disk 16 of the film cartridge 12. The photoelectric sensor 43, which may comprise, for instance, a light emitter for projecting light to the bar code disk 16 and a light receiver for receiving light reflected by the bar code disk 16, generates a photoelectric signal at a level as a bar code signal according to the strength of incident light and transmits it to the microcomputer 22 where the bar code signal is deciphered or decoded. In order for the film strip to be kept from fogging, the light emitter is desirable to be of a type emitting infrared light. Various types of photoelectric sensors are well known in the art and the photoelectric sensor 33 may take any one of well known types.

Microcomputer 22 further cooperates with a read only memory (ROM) 45 as a program ROM where camera control programs and control factors $\alpha$ and a random access memory (RAM) 46 as a temporary data RAM for temporarily storing data necessary for various controls, as well was the data ROM 42.

Figure 6:
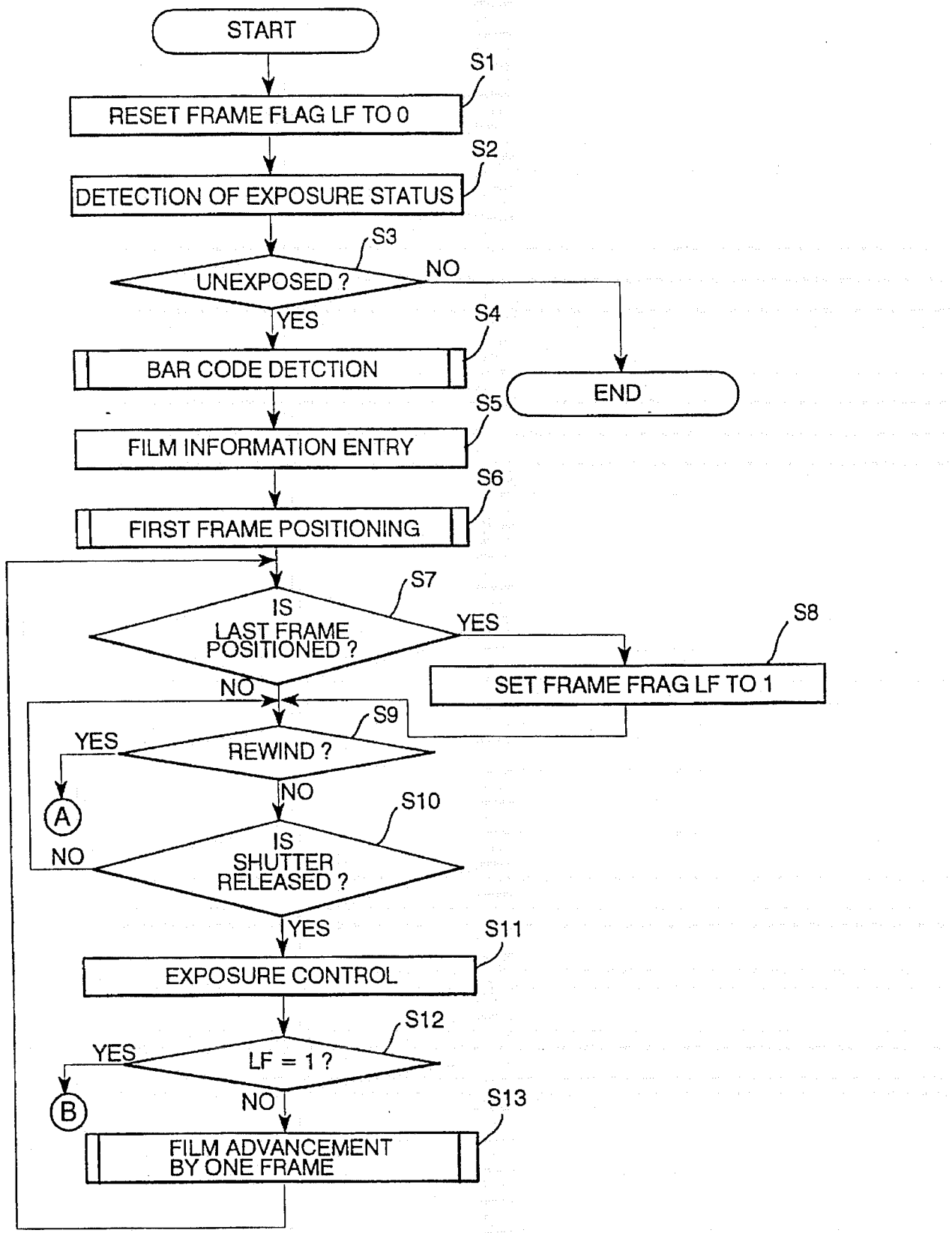
FIGS. 6 and 7 are a flow chart illustrating a film winding/rewinding sequence routine.
Figure 7:
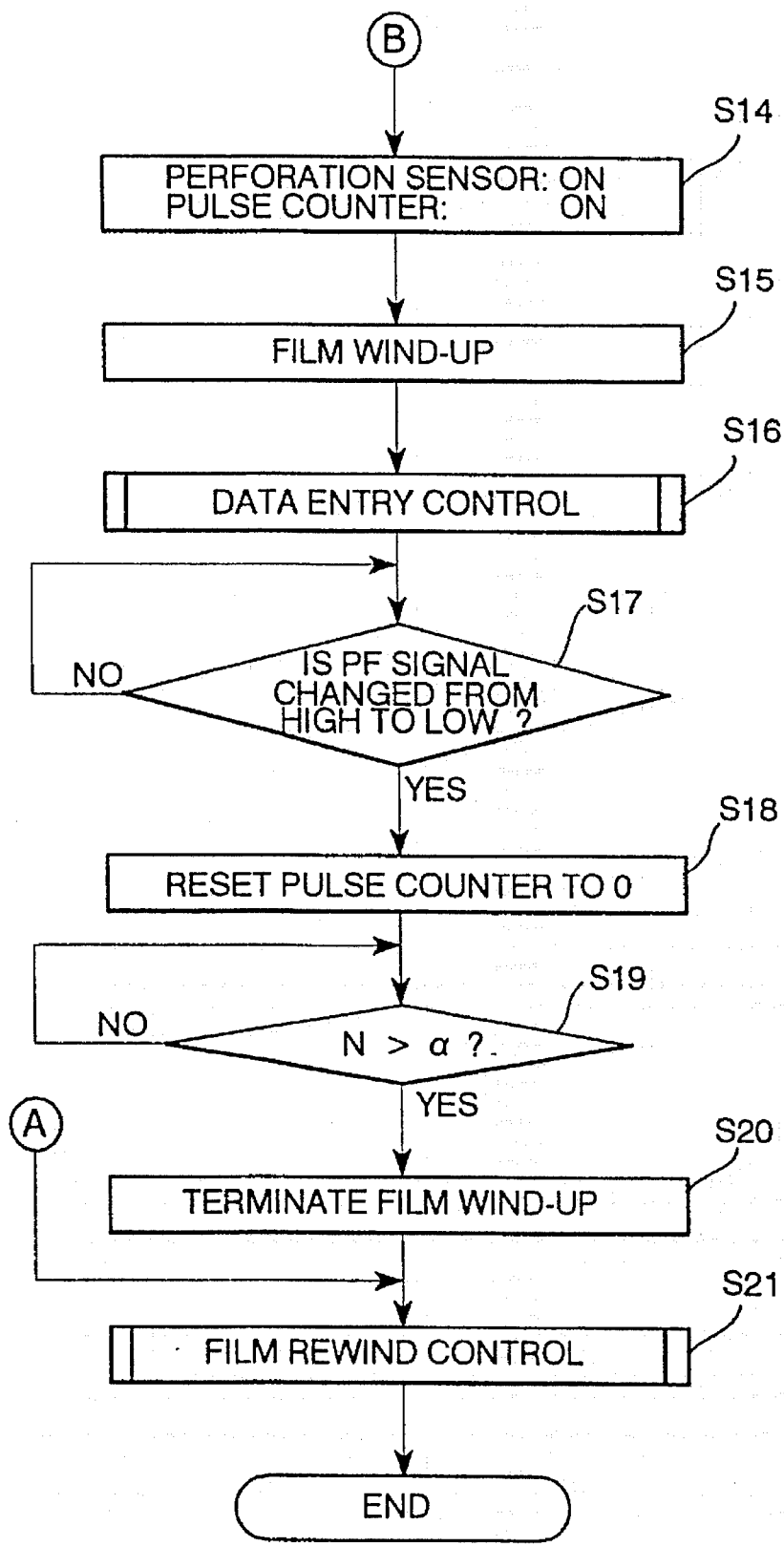

The operation of the camera 1 depicted in FIG. 1 is best understood by reviewing FIGS. 6 and 7, which are a flow chart illustrating a camera control routine for the microcomputer 22. Because programming a computer is a skill well understood in the art, the following explanation is written to enable programmers having ordinary skill in the art to furnish an appropriate program for the microcomputer 22. The particular details of such program would of course depend upon the architecture of the particular computer used.

Camera control routine commences following closing the camera back rid after loading the camera 1 with a film cartridge 12. Closing the camera back rid provides a start signal BRCS. Upon reception of the start signal, the microcomputer 22 initializes the camera control unit 1 and reset a frame flag FL to a state of "0" at step S1 and observes the film exposure status, i.e. whether the film strip 10 in the film cartridge 12 is fresh or at least partly exposed at step S2. As was previously described, this observation is performed by the utilization of, for instance, a micro switch adapted to contact the bar code disk 16 through the top opening 12a. In this instance, the frame flag FL is up or set to a state of "1" when the last image frame 10n of the film strip 10 is in the proper exposure position, and down or reset to the state of "0" which indicates that the image frame in the exposure position is not last image frame. Subsequently, a decision is made at step S3 as to whether the micro switch detects the bar code zone of the bar code disk 16. If the answer to the decision is "NO," this indicates that the bar code zone of the bar code disk 16 is not detected, in other word, that the quiet zone of the bar code zone is detected. The "NO" answer indicates that the film strip 10 in the film cartridge 12 has been exposed or developed, then, the camera control unit 2 may lights up an indicator light (not shown) to give an indication that a used film strip 10 in the film cartridge 12 is loaded. In such a case, the camera control routine is terminated.

When the micro switch detects the bar code zone of the bar code disk 16, i.e. when the answer to the decision made at step S3 is "YES," this indicates that the film strip 10 in the film cartridge 12 is fresh, then, the microcomputer 22 continues the sequential control routine. For reading the bar cord symbol of the bar code disk 16 of the loaded film cartridge 12 at step S4, following turning on the bar code sensor 43 and switching the drive mechanism 24 into the film rewinding mode, the motor 20 is actuated to rotate in the film rewinding direction with a result of turning the cartridge spool 13 with the bar code disk 16. During the rotation of the bar code disk 16, the microcomputer 22 deciphers or decodes a logical value of the combination of black and space bar codes 17 and 18 based on a bar code signal generated by the bar code sensor 43. As was previously described, the logical value represents information attributes to the film strip 10 loaded in the camera 1, such as the type of film strip 10, the speed of film strip and the number of available exposures. This film information is stored in the temporally data RAM 46 at step S5 and used for exposure control. Upon a completion of the decipherment of a logical value, the bar code sensor 43 and motor 20 are turned off.

Subsequently, a first image frame positioning control is performed at step S6 to place a first image frame $10_1$ of the film strip in a proper exposure position. In the first frame positioning control, following turning on the perforation sensor 31, while holding the drive mechanism 24 in the film rewinding mode, the motor 20 is turned on so as to rotate in the reverse direction, i.e. in the film winding direction. As a result, the cartridge spool 13 is turned to force the film strip out of the film cartridge 12 in the film winding direction toward the film wind-up spool 21. When the leader of the film strip 10 arrives at the film wind-up spool 21, the motor 20 is stopped and the drive mechanism 24 is switched into the film winding mode. Thereafter, the motor 20 is restarted in the film winding direction to rotate the film wind-up spool 21. During rotation, the film wind-up spool 21 catches the leader of the film strip 10 and winds up the film thereon. The arrival of film strip 10 at the film wind-up spool 21 may be detected on the basis of a perforation signal (PF) generated by the perforation sensor 31 upon a passage of the leading end of the film strip 10 over the sensor 31, or on the number of encode pulses N counted by the rotary encoder 35.

A change in level of the perforation signal (PF) occurs from high to low every time the leading edge of a perforation is detected by the perforation sensor 31, and from low to high every time the trailing edge of the perforation is detected by the perforation sensor 31. When a second level change of the perforation signal (PF) from high to low occurs, the motor 20 is quickly stopped to place the first image frame in the proper exposure position. Thereafter, every time a level change of the perforation signal (PF) from high to low occurs, the motor 20 is stopped to place an unexposed image frame in the proper exposure position and the perforation sensor 31 is coincidentally turned on. Further, a level change of the perforation signal (PF) from high to low or from low to high occurs, the exposure counter changes its count by an increment of 1 (one).

When exposure is made, an exposure conclusion signal EXCS is provided and sent to the microcomputer 22. The microcomputer 22 retrieves binary code data in conformity with the current exposure data from the data ROM 42 and transmits the binary code data to the magnetic head driver 41. Then, the perforation sensor 31 is turned on again and the motor 20 is restarted to advance the film strip 10 by one frame. When a change of the perforation signal (PF) from high level to low level occurs following an occurrence of a change of the perforation signal (PF) from low level to high level, the motor 20 is stopped again to place a subsequent image frame in the exposure position. While the film strip 10 is advanced by one frame, the magnetic head driver 41 drives the magnetic head 40 to record the binary code data in the recording track of the magnetic layer 81 along the currently exposed image frame. This operation is repeated every time exposure is made. When the film strip 10 partly exposed is unwound, the magnetic head driver 41 drives the magnetic head 40 to entry information, such as the exposed number of image frames and the serial number of the camera, in the magnetic layer 81 on the leader of the film strip 10.

At the end of film advancement by one frame, the microcomputer 22 compares the exposed number C counted by the exposure counter 33 with the number of available exposure read from the information of bar code disk 16 and stored in the temporally data RAM 46. When the counted number C reaches the number of available exposure, the frame flag FL is up or set to the state of "1" which indicates that the last image frame 10n is in the exposure position. This frame flag FL is down or set to the state of "0" at the initialization of the camera 1. At step S7, a decision is made based on the counted number C as to whether the last image frame 10n is in the exposure position. When the answer is "NO," or after setting the frame flag FL to the state of "1" at step S8 when the answer to the decision is "YES," another decision is made at step S9 as to whether there is a demand of rewinding the film strip 10 even before the full image frames $10_1, 10_2, \ldots, 10n$ are exposed. This decision may be made based on a signal provided by a rewind button (not shown). If the answer to the decision is "YES," the control routine skips to step S21 to rewind the film strip 10. If the answer to the decision is "NO," then, another decision is subsequently made at step S10 as to whether a shutter release is made. When any shutter release is not made, the control routine is repeated from the decision concerning the last image frame 10n at step S7. On the other hand, if the answer to the decision is "YES," exposure control is performed at step S11 in, for instance, an automatic exposure control manner well known in the art. After the exposure control made at step S11, a decision is made at step S12 as to whether the frame flag FL has been set to the state of "1". If the answer to the decision is "YES," this indicates that the exposure control was made for the last image frame 10n, then, the control routine takes a concluding film rewinding control for magnetic head cleaning and data entry through steps S14–S21. However, if the answer to the decision is "NO," this indicates that the exposure control was made for one of image frames $10_1, 10_2, \ldots, 10n$ before the last image frame 10n, then, after having performed film wind-up control at step S13, the control routine return to the decision concerning the last image frame 10n at step S7.

When an exposure conclusion signal EXCS is provided as a result of the exposure control made for the last image frame 10n, the first step in FIG. 7 is to turn on both perforation sensor 31 and pulse counter 36 at step S14. Subsequently, the motor 20 is turned on to rotate in the film winding direction so as to wind up the film strip 10 at step S15. The rotary encoder 35 generates one encode pulse at every specified angular of rotation of the motor 20 and sends it to the pulse counter 36. Simultaneously with the commencement of rewinding the film strip 10, at step S16, the magnetic head driver 41 drives the magnetic head 40 to magnetically record the binary code data representative of the exposure control in the recording track of the magnetic layer 81 along the last image frame 10n. During the film winding, a decision is made at step S17 as to whether the perforation sensor 31 detects the rear extremity perforation 14b for the last image frame 10n. This decision is made on the basis of a change in level of a perforation signal (PF) from high to low occurring following a change from low to high. This decision is repeated until the change in level of the perforation signal (PF) from high to low occurs. The "YES" decision causes the pulse counter 36 to perform successive directly-opposed operations at step S18. Specifically, upon an occurrence of a change in level of the perforation signal (PF) from high to low following a change from low to high, the pulse counter 36 is reset and, immediately thereafter, restarted to count encode pulses. The microcomputer 22 observes the count N of the pulse counter 36 so as to permit the motor 20 to continuously rotate in the film winding direction for film advancement until the count N reaches a pre-fixed number $\alpha$ which will be described in detail later. That is, a decision is made at step S19 as to whether the count number N has reached the prefixed number $\alpha$. When the answer is "YES," then, the motor 20 is stopped to terminate the concluding film rewinding control for film rewinding and data entry at step S20. Immediately thereafter, the control routine assumes the film rewinding process at step S21 to rewind the film strip 10 into the interior of the film cartridge 12.

With the progress of film advancement, the magnetic head 40 is passed over the turn-around perforation 15 keeping in contact with the magnetic layer 81 of the film strip 10. When the magnetic head 40, in particular its contact surface, cross the trailing edge of the turn-around perforation 15 in the recording track of the magnetic layer 81 of the film strip 10, the surface of the magnetic head 40 is rubbed by the edges of the turn-around perforation 15 and, as a result, dust and shavings having clung on the magnetic head surface are scoured off. In such a way, the turn-around perforation 15 functions as a simple magnetic head cleaner.

When the pulse counter 39 counts the number of encode pulses N identified by a specific number $\alpha$, the drive mechanism 24 is switched into the film rewinding mode immediately after a stop of the motor 20. Subsequently, the motor 20 is restarted in the film rewinding direction so as to rewind the film strip 10 into the film cartridge 12. During the rewinding of the film strip 10, the edges of the turn-around perforation 15 rubs the magnetic head surface and scours off dust and shavings having clung on the magnetic head surface. With the progress of rewinding the film strip 10, the exposure counter 33 changes its count C down by one every time the perforation sensor 31 detects one front extremity perforation 14a. At a lapse of a specified period of time after the exposure counter 33 has changed its count C to zero (0), the conclusion of film rewinding is determined. During rewinding the film strip 10, the magnetic head 40 records data of camera attributives on the recording track of the magnetic layer 81 of the leader of film strip 10. Even after the film strip 10 has been completely drawn into the interior of the film cartridge 12, the motor 20 continues to rotate to further turn the cartridge spool 13 on the basis of an exposure status signal from the micro switch until the quiet zone 19 of the bar code disk 16 is shown in the top opening 12a of the film cartridge 12.

Describing the pre-fixed number $\alpha$, letting D, G and P be the diameter of the outermost one of convolutions of the film strip 10 wound on the film wind-up spool 21, the gear ratio of the transmission mechanism 24 including the gear 25 and the number of encode pulses N generated every revolution of the output shaft of the motor 20, the distance or length Lu of film advancement per unit angle of the motor 20, i.e. for an interval between adjacent encode pulses is given by the following formula:

$$Lu = (D \times \pi)/(G \times P).$$

While the advanced length of film strip is obtained from the length Lu per unit angular rotation and the number of encode pulses N, the number of encode pulses N1 to be generated for a period from when the perforation sensor 31 detects the leading side edge of the rear extremity perforation 14b for the last image frame 10n to when the magnetic head 40 is passed over by the turn-around perforation 15 is found.

As was previously described, since the lengthwise distance $L_4$ is defined between the leading side edge of the rear extremity perforation 14b for the last image frame 10n and the trailing side edge of the turn-around perforation 15, the distance $L_{PH}$ is defined between the detecting position in the lengthwise direction of the photoelectric sensor 31 and the leading side end of the magnetic head 40, the length of film advancement L from when the perforation sensor 31 detects the leading side edge of the rear extremity perforation 14b for the last image frame 10n to when the magnetic head 40 is passed over by the turn-around perforation 15 is given by the following formula:

$$L = L_4 - L_{PH}.$$

On the other hand, since the number of encode pulses N1 generated from the perforation sensor 31 detects the leading side edge of the rear extremity perforation 14b for the last image frame 10n to when the magnetic head 40 is passed over by the turn-around perforation 15 is given by the following formula (I):

$$N1 = L/L_u = (L_4 - L_{PH})/\{(D\pi)/(G \times P)\} \quad (I)$$

This formula indicates that the magnetic head 40 is passed over by the turn-around perforation 15 when the pulse counter 36 counts the number of pulse N1 from a moment of detection of the leading side edge of the rear extremity perforation 14b for the last image frame 10n by the perforation sensor 31. From this fact, the number N1 is employed as a lower limit of the pre-fixed number $\alpha$.

If the film strip 10 is further wound up more than necessary after the passage of the turn-around perforation 15 over the magnetic head 40, it is strained with heavy tension between the spools 13 and 21 and comes to a halt, exerting an excessive load on the motor 20 or breaking away from the cartridge spool 13. This results in failure to rewind the film strip 10. For preventing these accidents, the utilization is made of an upper limit N2 of the pre-fixed number $\alpha$.

Letting $L_{END}$ be the length of film strip allowed to be withdrawn out of the film cartridge 12 from a moment of detection of the leading side edge of the rear extremity perforation 14b for the last image frame 10n by the perforation sensor 31, the number of encode pulses N2 for the length of film strip $L_{END}$, i.e. an upper limit of the pre-fixed number $\alpha$, is given by the following formula (II):

$$N2 = L_{END}/L_u = L_{END}/\{(D \times \pi)/(G \times P)\} \quad (II)$$

The factors $L_4$ and $L_{END}$ are standardized lengths for the new format film strip 10, and the factors $L_{PH}$, G and P are known attributive values of a camera for use with the new format of film strip 10. Further, the diameter D is experimentally obtained. Accordingly, the lower and upper limits N1 and N2 are unconditionally determined from the formulas (I) and (II), respectively. The pre-fixed number a is established to be larger than the lower limit N1 and less than the upper limit N2. The utilization of the pre-fixed number $\alpha$ enables the magnetic head 40 to be cleaned by the film strip 10 without a result of exerting an excessive load on the motor 20 or breaking the film strip 10 away from the cartridge spool 13. In this instance, because, while the diameter D of the outermost one of convolutions of the film strip 10 wound on the film wind-up spool 21 increases with an increase in wound-up length of the film strip 10, a change in the diameter D between before and after a certain moment is slight, the diameter D at a passage of the turn-around perforation 15 through the magnetic head 40 may be approximated as that before and after the passage.

Although, in order to determine the pre-fixed number $\alpha$, the length of film strip 10 between the leading side edge of the rear extremity perforation 14b for the last image frame 10n and the trailing side edge of the turn-around perforation 15 is employed in the camera described above, the utilization may be made of the length of film strip 10 between the trailing side edge of the rear extremity perforation 14b for the last image frame 10n and the trailing side edge of the turn-around perforation 15. In this instance, the number of encode pulses N counted from when the trailing side edge of the rear extremity perforation 14b for the last image frame 10n passes over the perforation sensor 31 is compared with the pre-fixed number $\alpha$ at step S19.

The pre-fixed number $\alpha$ may be determined during winding a film strip 10 in the concluding film rewinding control for magnetic head cleaning and data entry through steps S14–S21.

Figure 8:
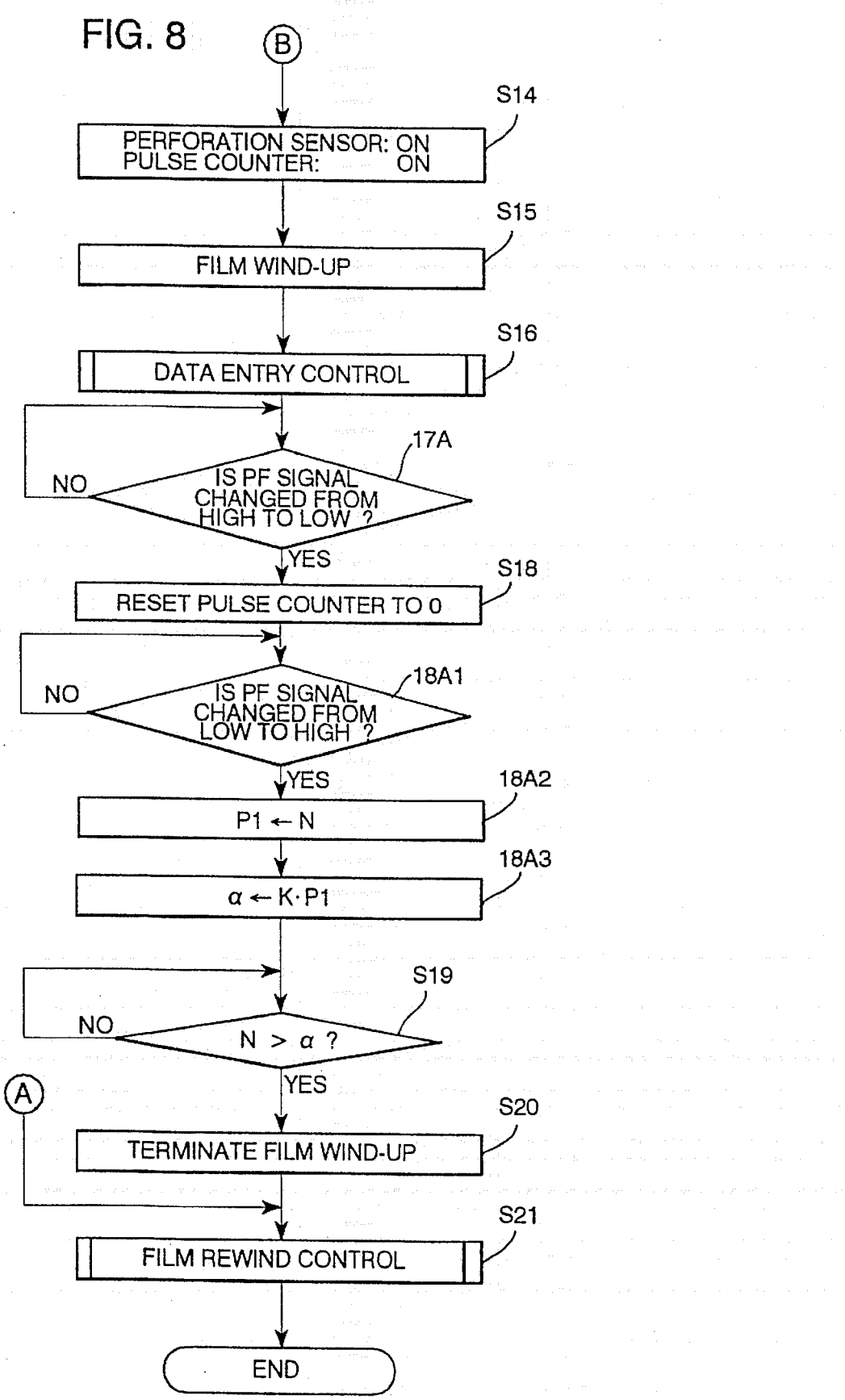
FIG. 8 is a flow chart illustrating a variant of part of the film winding/rewinding sequence routine which is similar to that of FIG. 7.

FIG. 8 is a modification of the concluding film rewinding control of FIG. 7, wherein the same numbers have been used to designate same or similar steps in operation as those in FIG. 7. In this modified concluding film rewinding control, a fixed number $\alpha$ is determined on the basis of the length of perforation $L_1$ and the number of encode pulses $P_1$ generated while the perforation sensor 31 detects the rear extremity perforation 14b for the last image frame 10n. When the perforation sensor 31 is passed over by the leading side edge of the rear extremity perforation 14b for the last image frame 10n after exposure of the last image frame and, consequently, provides a perforation signal (PF) changed in level from high to low at step S17A, the pulse counter 36 executes the successive directly-opposed operations at step S18. When the trailing side edge of the rear extremity perforation 14b for the last image frame 10n is detected by the perforation sensor 31 at step S18A1, the number of encode pulses N is picked up as a value $P_1$ at step S18A2. Subsequently, at step S18A3, the product of the value $P_1$ and a coefficient K is employed as the fixed number $\alpha$.

In this instance, since the length of rear extremity perforation 14b is given by $L_1$, the wound-up length of film strip 10 for an interval between adjacent encode pulses is given by the following formula:

$$Lu = L_1/P_1$$

In the same way, assuming that the fixed number $\alpha$ takes an intermediate value between upper and lower limits N1 (=L/Lu) and N2 (=$L_{END}$/LU), it is given by the following formula:

$$\begin{aligned}\alpha &= (N1 + N2)/2 \\ &= P_1 \cdot (L_4 - L_{PH} + L_{END})/2L_1\end{aligned}$$

In the formula, members other than $P_1$ are known beforehand and substituted as the coefficient K.

When the number of encode pulses N reaches the fixed number $\alpha$ at step S19, the film rewinding control is terminated at step S20 and the film rewinding control is subsequently performed at step S21.

The utilization may be made of the trailing side edge of the rear extremity perforation 14b or the front extremity perforation 14a in place of the leading side edge of the rear extremity perforation 14b in order to determine the fixed number α.

Figure 9:
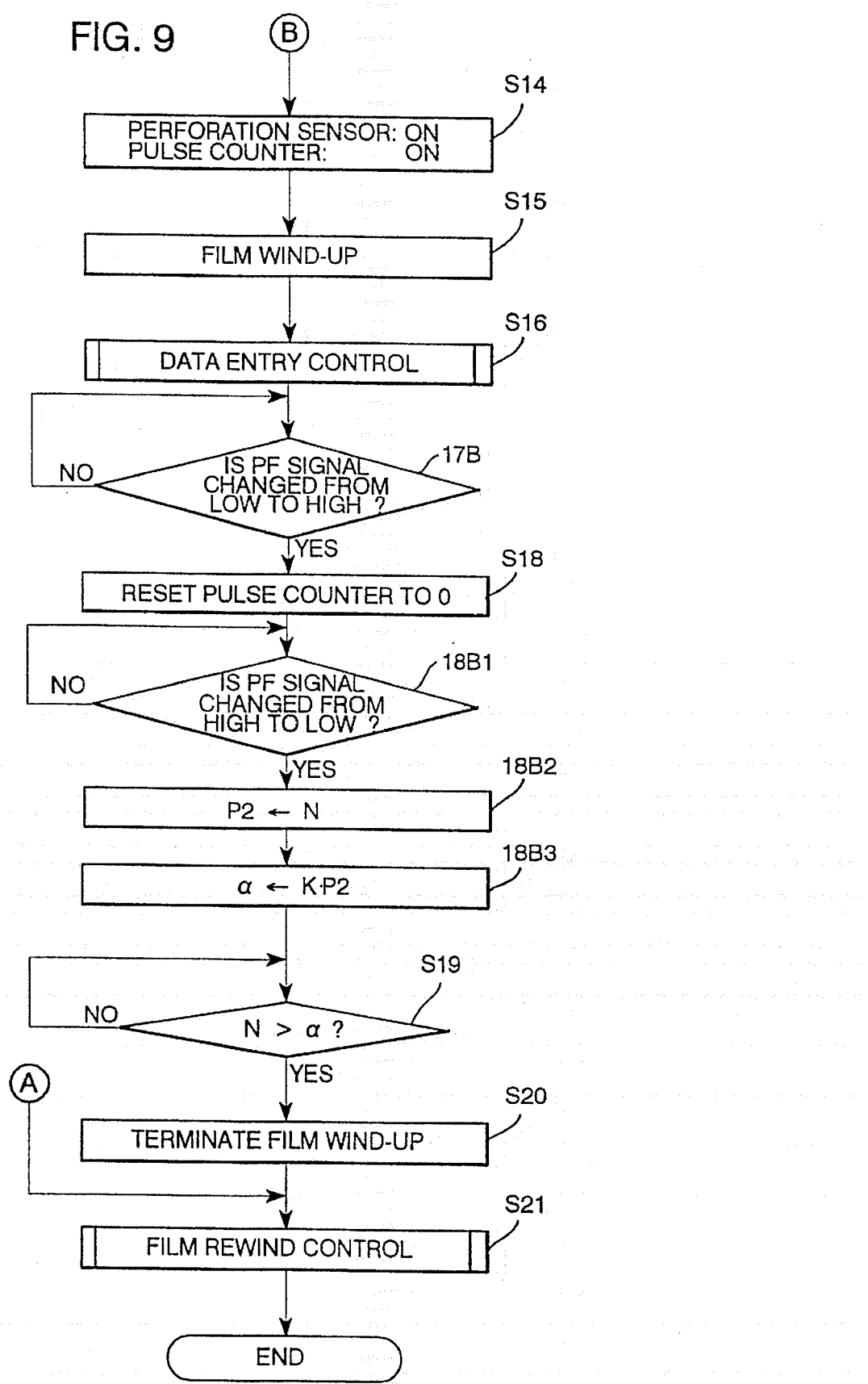
FIG. 9 is a flow chart illustrating another variant of part of the film winding/rewinding sequence routine which is similar to that of FIG. 7.

FIG. 9 is another modification of the concluding film rewinding control of FIG. 7, wherein the same numbers have been used to designate same or similar steps in operation as those in FIG. 7. In this modified concluding film rewinding control, in order to determine a fixed number α, the utilization is made of the distance or length $L_3$ between the front and rear extremity perforations 14a and 14b in place of the length of perforation $L_1$ and the number of encode pulses $P_2$ generated while the perforation sensor 31 detects the front and rear extremity perforations 14a and 14b for the last image frame 10n. When the perforation sensor 31 is passed over by the trailing side edge of the front extremity perforation 14a for the last image frame 10n and, consequently, provides a perforation signal (PF) changed in level from low to high at step S17B, the pulse counter 36 executes the successive directly-opposed operations at step S18. When the leading side edge of the rear extremity perforation 14b for the last image frame 10n is detected by the perforation sensor 31 at step S18B1, the number of encode pulses N is picked up as a value $P_2$ at step S18B2. Subsequently, at step S18B3, the product of the value $P_2$ and a coefficient K is employed as the fixed number α. In this instance, the fixed number α is assumed to take an intermediate value between upper and lower limits N1 and N2, the coefficient K is given by the following formula:

$$K=(L_4-L_{PH}+L_{END})/2L_3$$

In order to determine the fixed number α, the utilization may be made of any combination of edges of the front and rear extremity perforations 14a and 14b in place of the combination of the trailing side edge of the front extremity perforation 14a and the leading side edge of the rear extremity perforation 14b.

When taking an increase in the diameter D of the outermost one of convolutions of a film strip 10 wound on the film wind-up spool 21 into account, in determining the fixed number, it is the most reliable manner to employ the number of encode pulses N generated for an interval between detection of both edge of the rear extremity perforation 14b for the last image frame 10n immediately before the magnetic head 40 is passed over by the turn-around perforation 15 or the number of encode pulses N generated for an interval between detection of the front and rear extremity perforations 14a and 14b for the last image frame 10n. It is to be understood that even if a film strip having only a single perforation for one frame is used, the fixed number α can be established on the basis of perforation intervals and/or the length of perforation.

Figure 10:
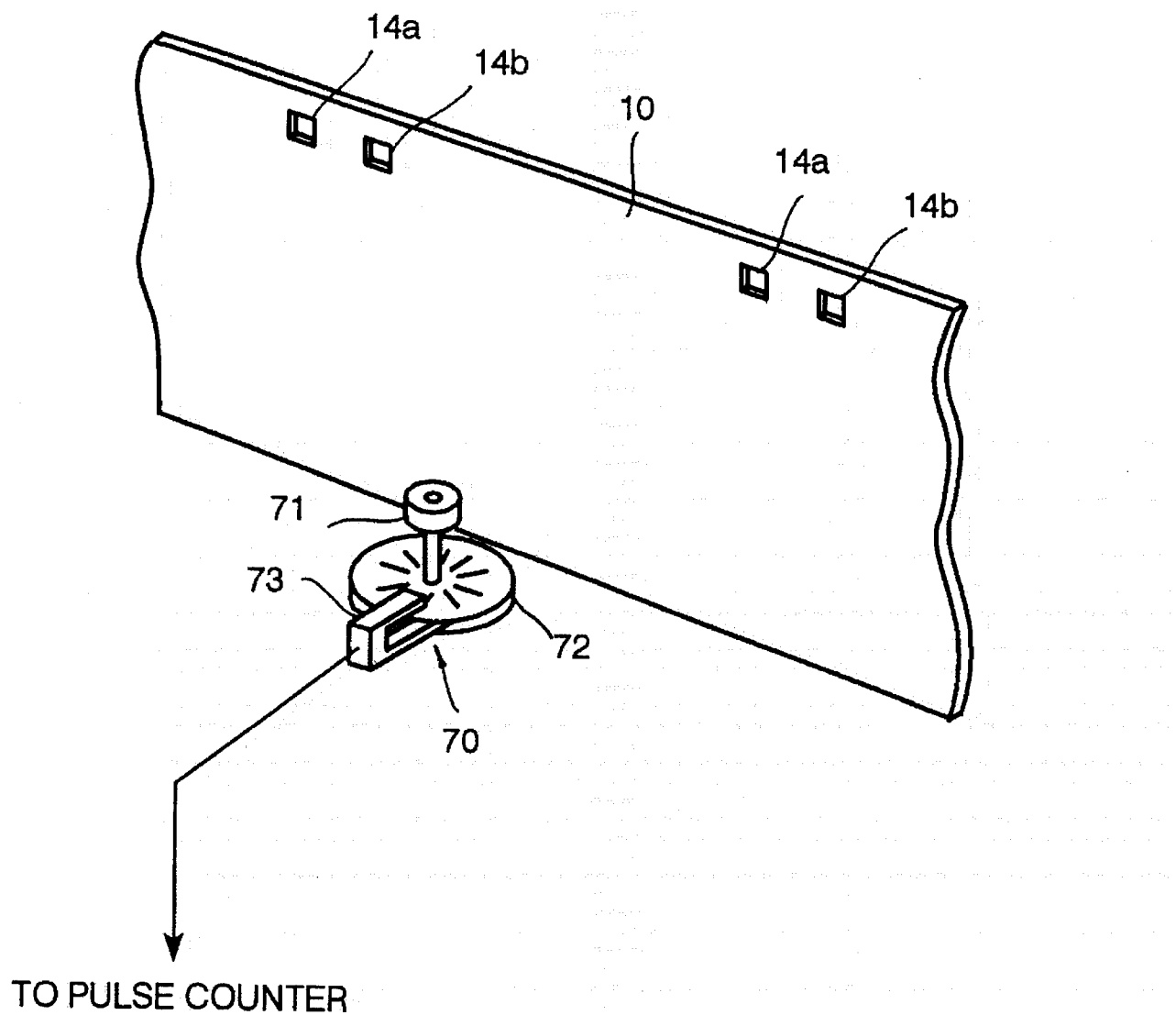
FIG. 10 is a perspective view of a rotary encoder shown by way of example, which is used to generate pulses in synchronism with film advancement.

The rotary encoder may be adapted to generate encode pulses according to advanced length of a film strip as shown in FIG. 10 in place of rotated angle of the motor 20.

Referring to FIG. 10, a rotary encoder 70 comprises an encoder disk 72 formed with a number of radial slits arranged at regular angular intervals, a photo-interrupter 73 of a type comprising a light emitter and a light receptor, and a friction roller 71 secured to the encoder disk 72 through a shaft 72a supported for rotation by a stationary part of the camera body (not shown) and driven by a film strip 10. The encoder disk 72 is put between the light emitter and light receptor of the photo-interrupter 73. The photo-interrupter 73 generates pulses one every time it detects a slit of the encoder disk 72. Encode pulses are counted by a pulse counter.

In this instance, the number of encode pulses is linearly proportional to and represents directly the length of film advancement. Upper and lower limits N1 and N2 of the fixed number α, are given as follows:

$$N1=(L_4-L_{PH}) \cdot P_3$$

$$N2=L_{END} \cdot P_3$$

wherein $P_3$ is the number of encode pulses generated per unit length of film advancement.

Figure 11:
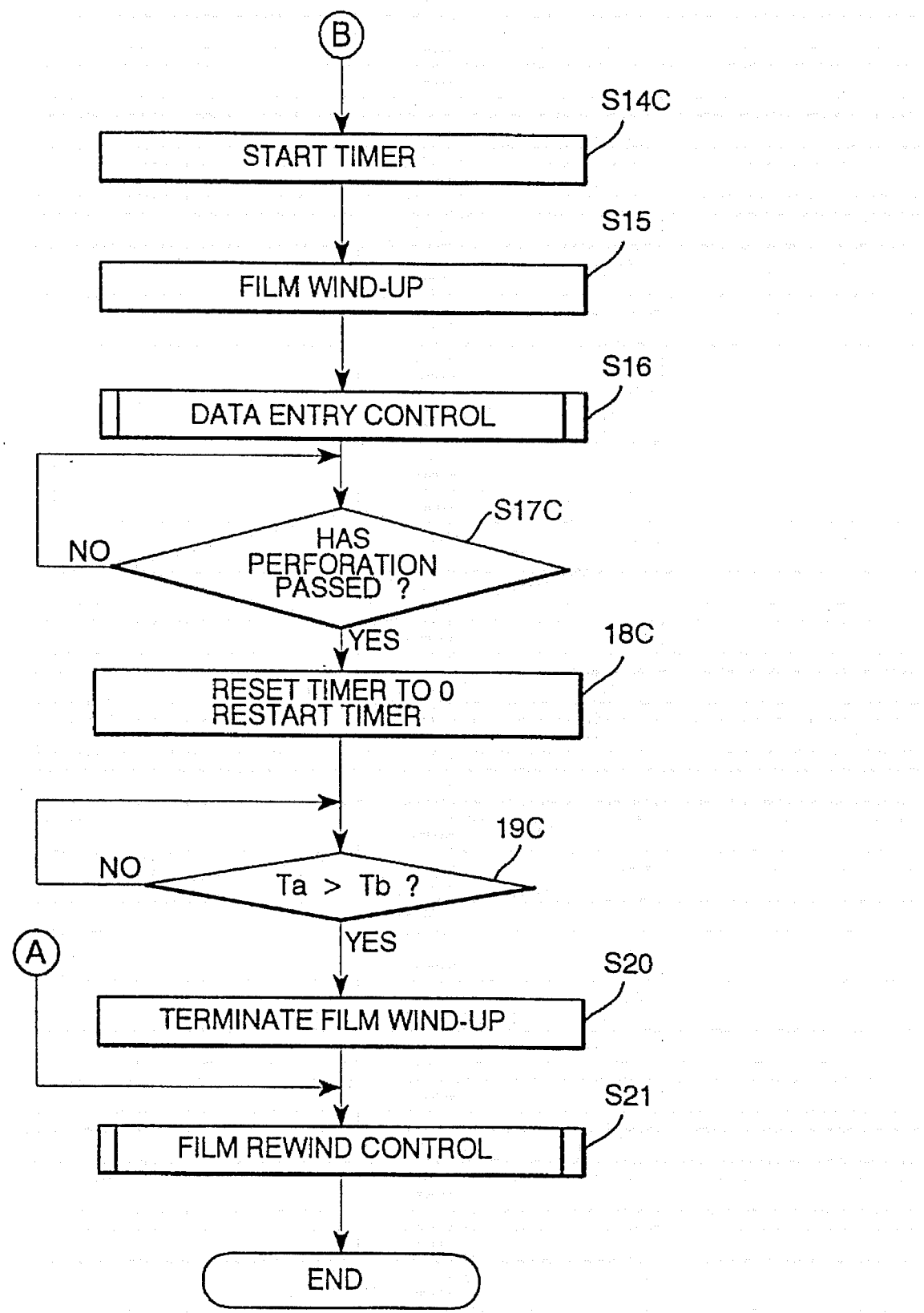
FIG. 11 is a flow chart illustrating another variant of part of the film winding/rewinding sequence routine which is similar to that of FIG. 7.

The concluding film rewinding control after exposure of the last image frame 10n may be controlled on the basis of a clock pulse provided on a fixed frequency as shown in FIG. 11, wherein the same numbers have been used to designate same or similar steps in operation as those in FIG. 7. This modification is on firm grounds that the length of film advancement is approximately proportional to a time of film advancement. In the modified concluding film rewinding control, a time necessary for a film strip to have its turn-around perforation 15 pass over the magnetic head 40 after detection of the rear extremity perforation 14b for the last image frame 10n is experimentally obtained. The experimental time with a margin considered is stored as a time Tb in the program RAM 45. The margin is established such that the whole length of film strip is not withdrawn out of the film cartridge 13.

When the rear extremity perforation 14b is detected by the perforation sensor 31 at step S16, the successive directly-opposed operations of a built-in counter of the microcomputer 22, which has started to count a clock pulse at step S14C, are caused at step S18C. Specifically, upon an occurrence of a change in level of a perforation signal (PF) from high to low, the built-in timer is reset and, immediately thereafter, restarted to count a clock pulse. When the counted time Ta reaches the experimental time Tb at step S19C, the film rewinding control is terminated at step S20 and the film rewinding control is subsequently performed at step S21. During this conclusion film rewinding control, the magnetic head 40 is cleaned by both edge of the turn-around perforation 15.

In place of the built-in timer of the microcomputer 22, an external pulse counter may be provided so as to count pulses generated on a fixed frequency by an extra pulse generator.

While the camera depicted in FIG. 1 determines the last image frame 10n on the basis of conformity of a count of pulses C of the counter 33 with the number of available exposure of a fresh film strip, it may be determined for permitting subsequently rewinding the film strip that film rewinding has made after exposure of the last image frame 10n when there is no occurrence of a perforation signal (PF) even if a specified number of encode pulses Y have been generated after the rear extremity perforation 14b has passed over the perforation sensor 31. In this instance, cleaning the magnetic head 40 is reliably performed by specifying the number of encode pulses Y such that the film strip is sufficiently advanced so as to have the turn-around perforation 15 pass over the magnetic head 40.

It is preferred to renew the number of encode pulses Y every time of film advancement by one frame. For the renewal of the number of encode pulses Y, a value Pb is calculated as the product of the number of encode pulses Pa obtained while the perforation sensor 31 detects the rear extremity perforation 14b of each image frame $10_1, 10_2, \ldots \ldots, 10n$, and a ratio of the interval $L_2$ between adjacent image frames relative to the length $L_1$ of perforation ($L_2/L_1$). In consideration of an increase in the diameter D of the outermost one of convolutions of a film strip 10 wound on the film wind-up spool 21, a calculation is made to the product of the value Pb and a coefficient K1 which is substituted for the encode pulse number Y. The coefficient K1 is specified such that the perforation sensor 31 is permitted to certainly detect a front extremity perforation 14a for an image frame after detection of the rear extremity perforation 14b for the preceding image frame. Renewing the encode pulse number Y for each image frame, the last image frame 10n is properly determined without the effect of an increase in the diameter D of the outermost one of convolutions of a film strip 10 wound on the film wind-up spool 21. The coefficient K1 is specified such that the renewed encode pulse number Y provides sufficient film advancement necessary for the film strip to have the turn-around perforation 15 pass over the magnetic head 40 with the effect of cleaning the magnetic head 40.

Figure 12:
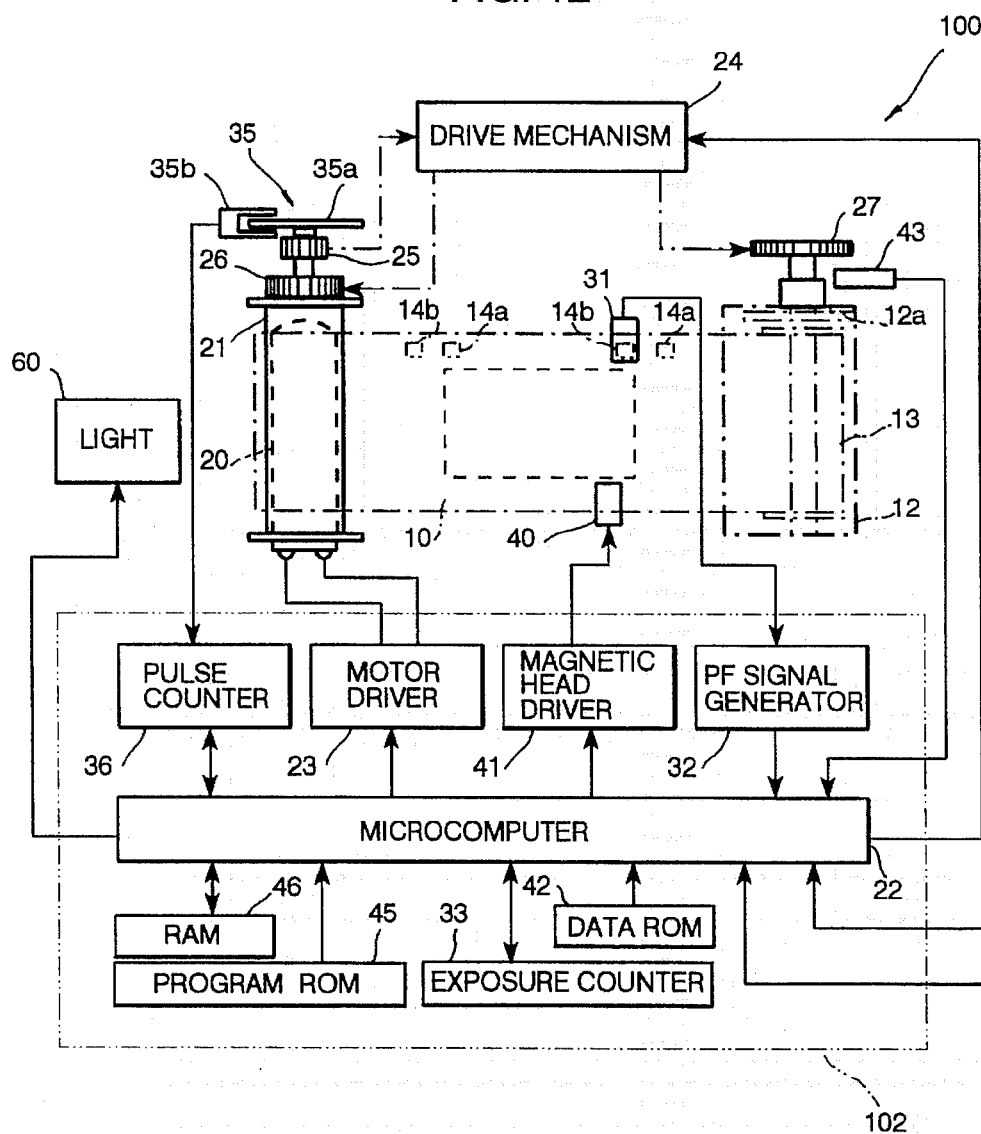
FIG. 12 is an illustration schematically showing a prewinding type of camera in accordance with another embodiment of the present invention.

FIG. 12 shows a still camera 100 of the type which automatically pre-winds substantially the entire length of an unexposed film strip 10 from a film cartridge 12 onto a film wind-up spool 21 when it is loaded with the film cassette 12 in accordance with another embodiment of the present invention. The camera 100 is provided with a perforation sensor 31 and a magnetic head 40. The perforation sensor 31 is located in a position where it detects a rear extremity perforation 14b when each image frame of the film strip 10 is properly placed just behind an exposure aperture 30 of the camera 100. The magnetic head 40 is located in a position far away from the cartridge spool 13 in the film cartridge 12 with respect to the perforation sensor 31.

Camera control unit 102 of the camera 100 of this type resets a pulse counter 46 when the perforation sensor 31 detects a leading end edge of a rear extremity perforation 14b for a last image frame $10_n$ and, immediately thereafter, causes the pulse counter 46 to restart to count encode pulses from a rotary encoder 35. The pulse counter 46 continues to count decode pulses until the count C reaches more than a specified number α, which permits the film strip 10 to have its turn-around perforation 15 pass over the magnetic head 40 for cleaning the surface of the magnetic head 40. Thereafter, the camera 100 rewinds the film strip 10 until the perforation sensor 31 provides a perforation signal (PF) changed in level from high to low. The first occurrence of a change in level of the perforation signal (PF) from high to low indicates that the perforation sensor 31 detects a rear extremity perforation 14b for the last image frame 10n of the film strip 10. Then, the motor 20 is instantaneously stopped, placing the last image frame 10n just behind the exposure aperture 30. The number α is specified based on lower and upper limits N1 and N2 in the same manner as described in connection with the previous embodiment. Because, in the camera 100, the magnetic head 40 is located in a position far away from the cartridge spool 13 in the film cartridge 12 with respect to the perforation sensor 31, the lower limit N1 for the number α is given by the following formula:

$$N1=(L_4+L_{PH})/\{(D\times\pi)/(G\times P)\}$$

The number α may be of course specified during winding the film strip 10 as shown in the flow chart illustrated in FIG. 8 or in FIG. 9. Further, the rotary encoder 35 may be replaced with a rotary encoder 70 which is driven by the film strip 10 to generate pulses shown in FIG. 10. The camera 100 may execute its concluding film rewinding control for magnetic cleaning and data entry according to a sequence routine shown in FIG. 11. Furthermore, the utilization may be made of a specified number of encode pulses Y for determination of the last image frame 10n and magnetic head cleaning.

Differently from the cameras 1 and 100 according to the invention each of which is provided with the magnetic head 40 fixedly attached to the camera body and the magnetic head 40 is always held in contact with the magnetic layer of a film strip 10 loaded in the camera 1, 100, there are cameras which are provided with a magnetic head brought into contact with the magnetic layer of a film strip when data entry is allowed. In such a camera, the magnetic head must be controlled so as to be continuously held in contact with the magnetic layer of a film strip following data entry for the last image frame.

With the camera equipped with a magnetic head for data entry according to the invention, a film strip in the camera is continuously advanced until the film strip has its turn-around perforation pass over the magnetic head, the magnetic head surface is rubbed by the edges of the turn-around perforation 15 and, as a result, dust and shavings having clung on the magnetic head surface are scoured off whenever the camera concludes the use of a roll of film strip. This maintains the magnetic head in good condition for data recording.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A photographic system comprising in combination a camera equipped with a magnetic head and a film strip having a magnetic layer coated on one side of a film substratum opposed to a side of the film substratum on which a photographic emulsion layer is coated and a perforation which is formed in a lengthwise margin of said film strip and is positioned at a specified distance from a last one of a row of image frames toward a trailer of said film strip, said magnetic head being located in a path of said perforation and held so as to be in contact with said magnetic layer so as to record data in a magnetic recording track while said film strip is being advanced, said camera comprising:

film advancing means including a reversible motor for winding and rewinding said film strip;

film advanced length observing means for observing advancement of said film strip to detect an advanced length of said film strip from when said last image frame passes over said magnetic head; and control means for continuously causing said film advancing means to advance said film strip until said film advancement observing means detects a specified length of advancement of said film strip so that said film strip has said perforation pass over said magnetic head, thereby rubbing a contact surface of said magnetic head with edges of said perforation for cleaning.

2. A photographic system as defined in claim 1, wherein said film advanced length observing means comprises a pulse generator for generating pulses one for every specified angular rotation of said reversible motor, a pulse counter for counting a number of pulses generated by said pulse generator, and means for calculating an advanced length of said film strip based on said number of pulses counted by said pulse counter.

3. A photographic system as defined in claim 1, wherein said film advanced length observing means comprises a pulse generator for generating pulses one per unit length of advancement of said film strip, a pulse counter for counting a number of pulses generated by said pulse generator, and means for calculating an advanced length of said film strip based on said number of pulses counted by said pulse counter.

4. A photographic system as defined in claim 1, wherein said film advanced length observing means comprises a pulse generator for generating pulses on a specified frequency, a pulse counter for counting a number of pulses generated by said pulse generator, and means for calculating an advanced length of said film strip based on said number of pulses counted by said pulse counter.

5. A photographic system comprising in combination a camera equipped with a magnetic head and a film strip having a magnetic layer coated on one side of a film substratum opposed to a side of the film substratum on which a photographic emulsion layer is coated, said film strip having a frame perforation for each of a row of image frames formed in one lengthwise margin of said film strip and a perforation formed in another lengthwise margin of said film strip and positioned at a specified distance from a last one of said image frames toward a trailer of said film strip, said magnetic head being located in a path of said perforation and held to be in contact with said magnetic layer so as to record data in a magnetic recording track while said film strip is being advanced, said camera comprising:

film advancing means including a reversible motor for winding and rewinding said film strip;

pulse generating means for generating pulses in synchronism with rotations of said reversible motor;

a perforation sensor for detecting both edges of each said frame perforation;

a pulse number determining means for detecting a speed of advancement of said film strip based on a number of pulses which said pulse generating means generates for a period between detection of a leading side edge and a trailing side edge of each said frame perforation by said perforation sensor and a distance between said leading side edge and said trailing side edge of each said frame perforation and for determining a critical number of pulses to be generated by said pulse generator necessary for said reversible motor to advance said film strip by said specified distance based on said speed of advancement of said film strip so that said film strip has said perforation pass over said magnetic head, so as thereby to rub a contact surface of said magnetic head with said edges of said perforation for cleaning.

6. A photographic system comprising in combination a camera equipped with a magnetic head and a film strip having a magnetic layer coated on one side of a film substratum opposed to a side of the film substratum on which a photographic emulsion layer is coated, said film strip having a frame perforation for each of a row of image frames formed in one lengthwise margin of said film strip and a perforation formed in another lengthwise margin of said film strip and positioned at a specified distance from a last one of said image frames toward a trailer of said film strip, said magnetic head being located in a path of said perforation and held to be in contact with said magnetic layer so as to record data in a magnetic recording track while said film strip is being advanced, said camera comprising:

film advancing means including a reversible motor for winding and rewinding said film strip;

pulse generating means for generating pulses in synchronism with rotation of said reversible motor;

a perforation sensor for detecting both edges of each said frame perforation;

a pulse number determining means for detecting a speed of advancement of said film strip based on a number of pulses which said pulse generating means generates for a period between detection of each adjacent two frame perforations and a distance between each adjacent two frame perforations and for determining a critical number of pulses to be generated by said pulse generator necessary for said reversible motor to advance said film strip by said specified distance based on said speed of advancement of said film strip so that said film strip has said perforation pass over said magnetic head, so as thereby to rub a contact surface of said magnetic head with said edges of said perforation for cleaning.

* * * * *